US011715101B2

(12) United States Patent
Braundmeier et al.

(10) Patent No.: US 11,715,101 B2
(45) Date of Patent: Aug. 1, 2023

(54) SINGLE-USE PAYMENT TOKENS

(71) Applicant: MASTERCARD INTERNATIONAL INCORPORATED, Purchase, NY (US)

(72) Inventors: Aaron Braundmeier, O'Fallon, MO (US); Anthony Hake, Lake St Louis, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 17/565,546

(22) Filed: Dec. 30, 2021

(65) Prior Publication Data

US 2023/0214829 A1    Jul. 6, 2023

(51) Int. Cl.
*G06Q 20/38*        (2012.01)
(52) U.S. Cl.
CPC .................. *G06Q 20/385* (2013.01)
(58) Field of Classification Search
CPC .................................................. G06Q 20/385
USPC .......................................................... 705/39
See application file for complete search history.

(56) References Cited

U.S. PATENT DOCUMENTS

| | | | |
|---|---|---|---|
| 10,970,707 B1 | 4/2021 | Techel et al. | |
| 2008/0243689 A1* | 10/2008 | Pinnell | G06Q 20/102 |
| | | | 705/42 |
| 2014/0108260 A1* | 4/2014 | Poole | G06Q 20/321 |
| | | | 705/64 |
| 2014/0310182 A1 | 10/2014 | Cummins | |
| 2015/0150471 A1* | 6/2015 | Baida | A61B 5/339 |
| | | | 600/523 |
| 2016/0267458 A1* | 9/2016 | Metral | G06Q 20/20 |
| 2016/0267480 A1* | 9/2016 | Metral | G06Q 20/3226 |
| 2017/0046691 A1 | 2/2017 | Tierney et al. | |
| 2017/0352026 A1 | 12/2017 | Musil et al. | |
| 2019/0238684 A1 | 8/2019 | Chau et al. | |
| 2021/0125164 A1 | 4/2021 | Mehrhoff et al. | |
| 2021/0167962 A1 | 6/2021 | Wang et al. | |

OTHER PUBLICATIONS

International Search Report and Written Opinion dated Feb. 14, 2023 which was issued in connection with PCT Application No. PCT/US2022/049371. 14 pages.

(Continued)

*Primary Examiner* — Lindsay M Maguire
(74) *Attorney, Agent, or Firm* — Buckley, Maschoff & Talwalkar LLC (57) ABSTRACT

Provided are systems and methods for managing and implementing single-use payment-enabled tokens. In one example, a method may include distributing, via a server, a payment-enabled token to a payment application on a computing device, the payment-enabled token being mapped to a payment account of the payment application via a tokenization service, detecting use of the payment-enabled token as a payment via the payment application, and in response to the detecting, deactivating the payment-enabled token at the server and storing an identifier of the payment-enabled token and an additional data element of the payment-enabled token that identifies the payment account together within a data structure of the server.

17 Claims, 9 Drawing Sheets

(56) References Cited

OTHER PUBLICATIONS

EMVCO: -"EMV Payment Tokenisation Specification—Technical Framework Subscriber review ends Apr. 8, 2017", EMV, EMVCO vol. 2; Payment Tokenisation Feb. 7, 2017 (Feb. 7, 2017), pp. 1-118, XP061034295, Retrieved-from the internet: URL:https://www.emvco.com/wp-content/uploads/documents/Payment_Tokenisation_Specification v2.15.zip Payment Tokenisation Specification v2.15 (TA Review).pdf [retrieved on 2017_06_191_Sections 4.3.2.4,4.3; 3, 6, 7.7—Parts A, B, C & D.

\* cited by examiner

| Token ID | PAR Value | Activation Status |
|---|---|---|
| 6723 2193 2239 9029 | G54D 34FHG80PXC5932A0345GQ1369 | Active |
| 6723 4094 5732 2917 | DR34 4479043EWQ221056KLR694322 | Deactivated |
| 6723 4704 5532 8206 | G54D 34FHG80PXC5932A0345GQ1369 | Deactivated |
| 6723 2192 9048 3348 | G54D 34FHG80PXC5932A0345GQ1369 | Active |
| ... | ... | ... |
| 6723 2192 3795 6043 | BG45 6792WST9234508655S9Q3509DS | Deactivated |

SINGLE-USE PAYMENT TOKENS

BACKGROUND

Merchant computer systems are often the weakest link in the security of a chain of computers involved in a credit card purchase. Large data breaches typically occur at the merchants and not at the banks that handle payment card transactions for the merchants. Tokenization is a process which replaces sensitive data from a payment card (e.g., an account number, etc.) that is passed to the merchant with a non-sensitive arbitrary identifier (e.g., number, etc.) referred to as a token. A mapping between the account number and the token identifier can be maintained by a tokenization service provider such as a token vault or a digital enablement services. When a cardholder submits the token as a form of payment to the merchant, the merchant then submits a payment authorization request to the payment network. Here, the tokenization service maps the token back to the actual account number. This mapping process happens within the payment network (i.e., beyond the reach of the merchant). Thus, the merchant is not allowed access to the actual account number thereby reducing the possibility that the account number will be breached and used fraudulently.

However, there is still a possibility that a token can be obtained and used fraudulently by an unauthorized party. The token itself may be payment-enabled just like a digital account number. Therefore, simply having possession of the payment-enabled token creates a risk because token itself could be compromised and used in an unauthorized way as a form of payment at less secure merchants. Accordingly, what is needed is an improved way to manage a lifecycle of a token.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

In the example embodiments, a payment-enabled token is a surrogate value that replaces the primary account number (PAN) in a payment ecosystem. Payment-enabled tokens are designed to provide transparency to payment ecosystem stakeholders when accepting and processing payment-enabled tokens. Payment-enabled tokens may be restricted to specific domains. For example, a payment-enabled token may be usable only within the e-commerce acceptance channel at a specific merchant.

EMV ("Europay, Mastercard, and Visa") is a payment method based upon a technical standard designed for smart payment cards and payment terminals and teller machines that accept them. EMV defines a technical framework to generate, deploy and manage payment-enabled tokens in a reliable and interoperable manner globally at the point of acceptance. The aim is to provide a level of commonality across the payment ecosystem to support adoption while enabling levels of differentiation that promote innovation. This is achieved while maintaining compatibility with the existing payment infrastructure and providing the potential for increased security by limiting the risk typically associated with compromised, unauthorized or fraudulent use of PANs.

Payment tokenization enhances the underlying security of digital payments by potentially limiting the risk typically associated with compromised, unauthorized or fraudulent use of PANs. Payment tokenization achieves this by replacing PANs with payment-enabled tokens that differ significantly in terms of the ability to control or restrict usage to its intended use, e.g. a device or other domain. The implementation of payment tokenization solutions aligned with the technical framework of EMV provides opportunities to enhance the security of digital payments for issuers, merchants, acquirers, payment processors and stakeholders in the broader acceptance community.

Tokenization reduces the value of stored payment credentials by replacing them with a. 'token'. The token is a different number than the customer's PAN, but often with the same format, and can only be mapped to the original PAN by trusted parties such as a token service provider (TSP). Although this increases security, it also presents challenges. A cardholder may be provided with many different tokens over the lifetime of a payment account. Each token also maps back to the same account number. This results in a single PAN being linked to multiple tokens across different payment instruments and channels. As only the token service provider (TSP) can see the relationship between the original PAN and all of its related tokens, this can make it difficult for other entities down the chain to gain an aggregated view of the transactions performed by the original credential. As a consequence, their ability to deliver value-added services such as loyalty and couponing, and in some cases manage regulatory requirements or provide transaction risk scoring, is impacted. This is because these functions often rely on the ability to identify transactions at the aggregate PAN level to enable monitoring and analysis of consumer behavior.

To address this problem, EMV introduced a payment account reference (PAR) value which addresses this issue because it allows PAN-based and related token-based transactions to be linked together, and enables the payments acceptance community to perform these functions consistently while maintaining security. In particular, when a new token is created according to the EVM standard/framework, the token is assigned a PAR that links back to the original account number. This same PAR may also be added to each additional token that is linked to the same account number thereby ensuring that each individual token is mapped back to the corrected account number for subsequent processing and auditing. The PAR value is a 29 character value defined by the EMV framework. The first subset of digits (e.g., the first four digits) identify a Bin controller, while the remaining subset of digits (second subset of digits) are unique to the account number.

The example embodiments leverage this inherent data value (e.g. the PAR value) that is already present in EMV tokens in order to address the above-noted security issues with payment-enabled tokens. In particular, in response to detecting the use of a payment-enabled token (i.e., an EMV token) as a form of payment, the tokenization service may deactivate the token so that it cannot be used for the time being. As an example, the deactivation process may add a flag to the token in the backend system, move the token from a pool of active tokens to a pool of deactivated tokens, and the like. In addition, the tokenization service may extract an additional data element from the token and store the additional data element with an identifier of the token at the backend system for subsequent auditing and returns. According to various embodiments, the additional data element may be the PAR value that is assigned to the digital token in accordance with the EMV tokenization standard. By storing the PAR value with the token, the backend system can subsequently map the payment account to the token when a request for a refund or an audit request is received for the payment account. Thus, even though the token is deactivated, the transactions made using the token can still be accounted for and adjusted if necessary.

Furthermore, the deactivation of the token may be temporary. In other words, the token may be deactivated for a predetermined amount of time (e.g., 90 days, 120 days, 180 days, 1 year, etc.) When the deactivation period is over with, the backend may activate the token (e.g., add the token to a pool of unused tokens) and reassign the token to another card/cardholder. To monitor the time, the backend may schedule and execute a time-to-live task (e.g., a cron job, etc.) with an executable script which creates a timing function and which includes an identifier of the token. When the timing function expires or reaches its predetermined end point, the time-to-live job terminates and the backend activates the deactivated token and returns the newly activated token into the pool of available and unused tokens. Accordingly, the tokenization service can self-manage the activation, deactivation, and resumption of payment-enabled tokens in an automated and secure manner.

In the examples herein, a cardholder may be a person who obtains a bank card such as a payment card, a debit card, a credit card, and the like. It should be appreciated that the cardholder may also be referred to as an account holder, or the like. The payment vehicle need not be a plastic card. Instead, the payment vehicle may include a digitized payment account stored on a mobile device, etc.

A merchant is any business that sells goods or services. A merchant can accept payment cards from a cardholder as a form of payment. A merchant maintains a merchant account (e.g., with an acquiring bank, etc.) that enables them to accept credit cards and debit cards as payments and have the funds deposited therein.

An acquiring bank (also referred to herein as an acquirer) is a registered member of the card associations (e.g., Visa and MasterCard). An acquiring bank is often referred to as a merchant bank because they contract with merchants to create and maintain accounts (called merchant accounts) that allow the business to accept credit and debit cards. Acquiring banks provide merchants with equipment and software to accept cards and handle customer service and other necessary aspects involved in card acceptance. The acquiring bank also deposits funds from credit card sales into a merchant's account.

An issuing bank (also referred to herein as an issuer) issues credit cards to consumers. The issuing bank is also a member of the card associations (Visa and MasterCard). Issuing banks pay acquiring banks for purchases that their cardholders make. It is then the cardholder's responsibility to repay their issuing bank under the terms of their credit card agreement.

The single-use tokens that are described herein may be received in response to or based on a credit card tokenization process. During a credit card tokenization process, a tokenization entity, such as a tokenization service, may extract a card number from an account or a payment card and convert the sensitive card number data into de-identified data referred to as a token. The token may be a string of randomly generated numbers that have a format that matches the format of a traditional credit card number. Furthermore, the tokenization entity may write the token to a secure element or other hardware device/memory of the mobile device which also includes a payment application that requested the token.

Although the following examples describe the token as a payment-enabled token and/or a single-use token, the examples described herein are applicable to all types of tokens including multi-use tokens and non-payment enabled tokens. For example, a multi-use token could easily be monitored with an extra column in the example of FIG. 3B, which stores a usage count.

Figure 1A:
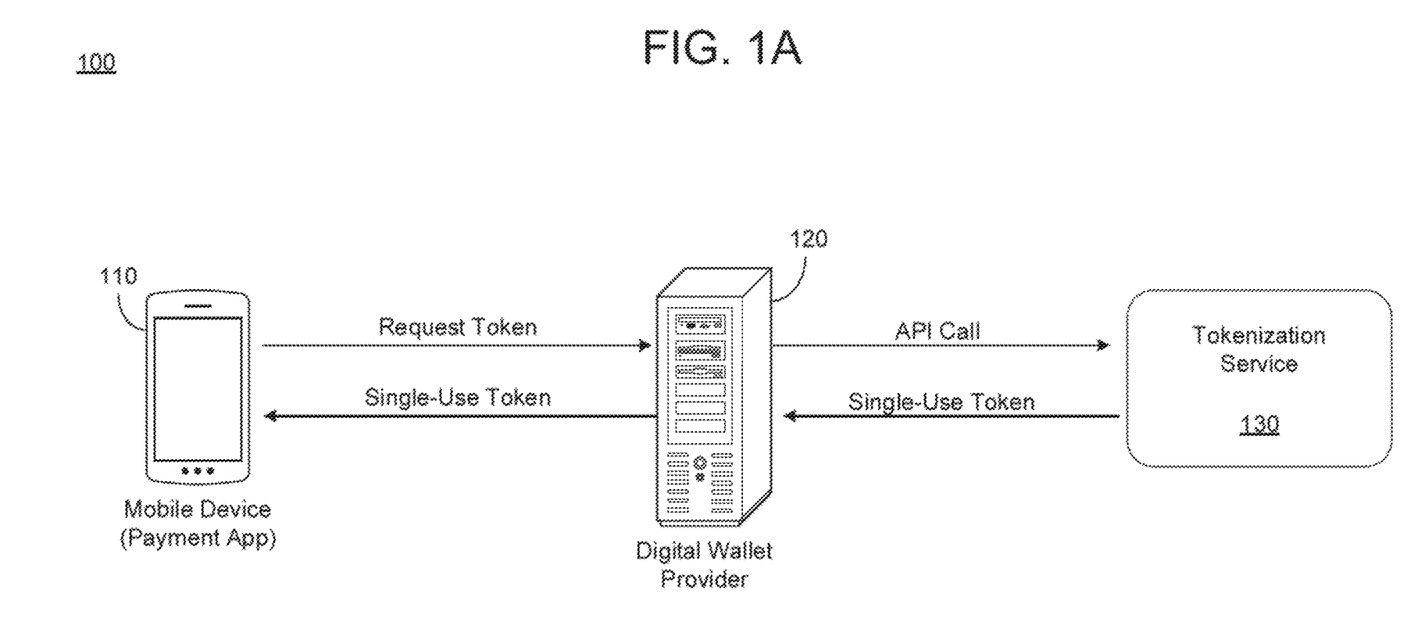
FIG. 1A is a diagram illustrating a process of requesting a single use token from a tokenization service in accordance with an example embodiment.

FIG. 1A illustrates a process 100 of a payment application on a mobile device 110 submitting a request for a payment-enabled token to a tokenization service in accordance with an example embodiment. Referring to FIG. 1A, a user may install and execute a payment application on the mobile device 110. For example, the payment application may be a digital wallet, or the like, which can be browsed via an application marketplace, downloaded via a network, and installed on the mobile device 110. Once installed, the user (cardholder) may register payment cards into the payment application. Each payment card may have its own unique payment account number (PAN).

At some point, either during the registration or subsequent to the registration, the payment application running on the mobile device 110 may request and receive a payment-enabled token for a particular payment card registered with the payment application. In some cases, the token may be a digital token that satisfies the requirements of the EMV framework. The request may be sent to a host of the payment application (e.g., a digital wallet provider 120, etc.) In response, the digital wallet provider 120 may transmit a call, such as an application programming interface (API) call to a tokenization service 130 with a request for a single-use token. In response, the tokenization service may return a single-use token that is then stored inside the payment application on the mobile device 110. As a non-limiting example, the tokenization service 130 may be a digitization service, a tokenization service, a token vault, an enablement service, and the like. In one example, the tokenization service 130 is a MASTERCARD® digital enablement services (MDES) server, but embodiments are not limited thereto.

The single-use token may be good for only one single use after which it is deactivated by the tokenization service 130 thereby preventing the single-use token from being reused. The API call may include a field with an identifier of the payment account number (PAN) and a field with an identifier of the payment application itself (e.g., a unique serial number, etc.) that uniquely identifies the payment application and the mobile device 110. In addition to generating and distributing the single-use token, the tokenization service 130 may store a mapping between the identifier of the single-use token and the PAN of the cardholder.

Figure 1B:
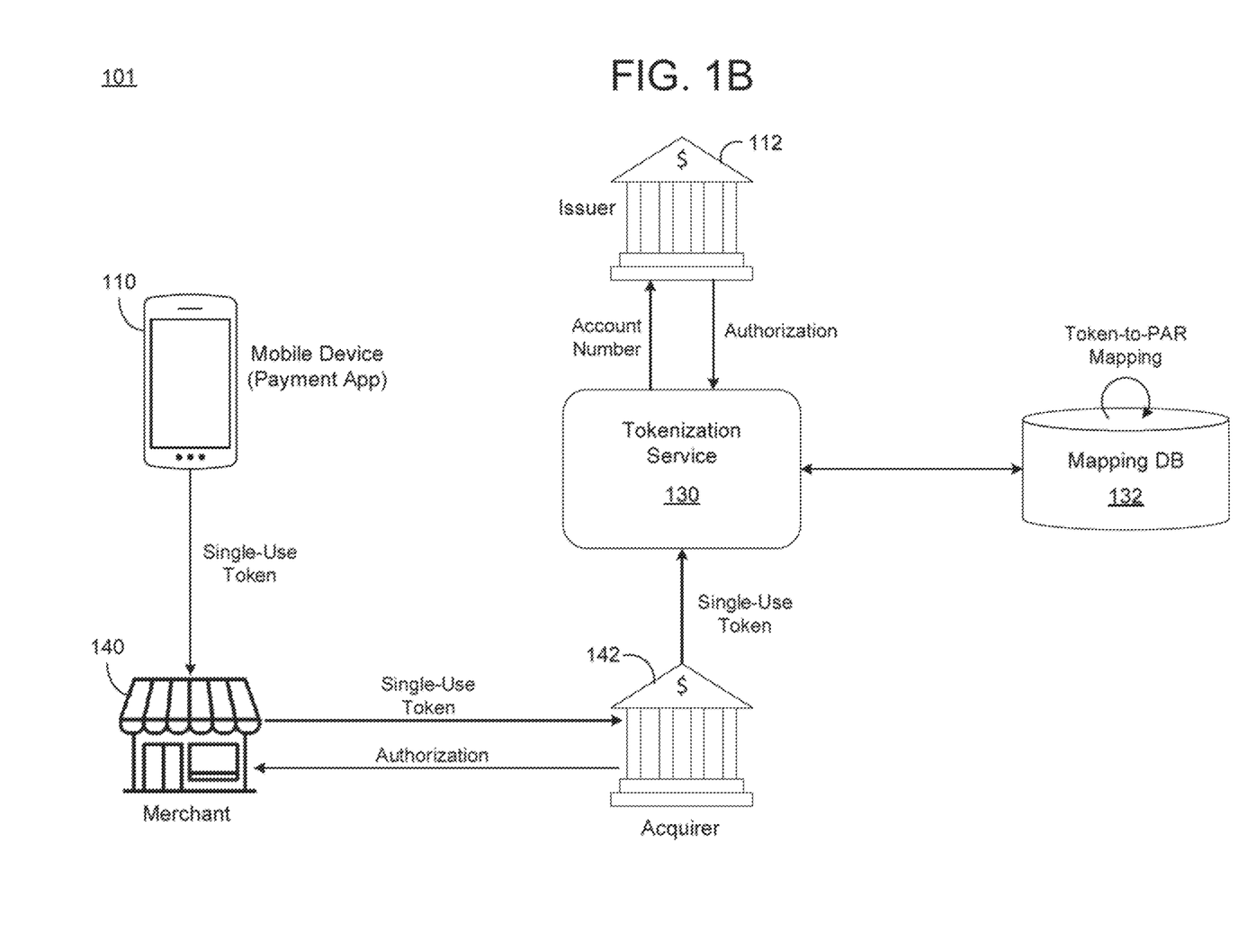
FIG. 1B is a diagram illustrating a process of deactivating the single-use token in accordance with an example embodiment.

FIG. 1B illustrates a process 101 of using the single-use token as a form of payment and deactivating the single-use token in accordance with an example embodiment. Referring to FIG. 1B, the payment application on the mobile device 110 may submit the single-use token via a merchant POS terminal (e.g., a tap, a swipe, a scan, etc.) or it may submit the token via an e-commerce site such as a checkout page on a mobile application or a website. The payment application running on the mobile device 110 may request a payment token from the tokenization service 130. For example, a user may log into the payment application/digital wallet application and initiate a payment transaction by selecting opening the payment application, selecting a button within the payment application, visiting a merchant checkout page via a web browser or mobile application, and the like.

In response, the tokenization service 130 may generate the single-use token, map the single-use token to the payment account number registered via the payment application, and transfer the single-use token to the payment application such that the single-use token can be used as a payment account identifier in a single payment transaction between the payment application and the merchant 140. Here, the single-use token is delivered to a merchant 140 (e.g., a computer terminal of the merchant 140) as a form of payment for goods and/or services from the merchant 140.

In response, the merchant 140 may submit the single-use token to its bank (acquirer 142) which then forwards the single use token to the tokenization service 130 for verification. In response, the tokenization service 130 may perform the traditional steps of a tokenization service and map the single-use token to its actual payment account number (which is stored securely by the tokenization service 130). Next, the tokenization service 130 may use the account number to verify that the payment account has sufficient funds to cover the transaction. This can be verified with an issuer 112 of the payment account. Assuming the account has sufficient funds, the issuer 112 authorizes the transaction and returns an authorization to the tokenization service 130. In response, the tokenization service 130 transmits a notice of successful authorization of the single-use token to the merchant 140 via the acquirer 142 and the transaction is completed.

In addition to performing the traditional tokenization and verification processes as described in FIGS. 1A and 1B, according to various embodiments, the tokenization service 130 may also perform a new functionality that is not well-known in the art. For example, the tokenization service 130 may deactivate the single-use token as further described in the examples of FIGS. 3A and 3B. The deactivation process may prevent the single-use token from being reused, even by the proper owner. In other words, after the single use, the single-use token expires. To deactivate the single-use token, the tokenization service 130 may store a flag with the single-use token. In addition, the tokenization service 130 may delete the mapping of the single-use token to the payment account number. As another example, the tokenization service 130 may store a table, document, spreadsheet, etc. with a list/pool of active single-use tokens and another list/pool of deactivated single-use tokens. The tokenization service 130 may move the single-use token from the active pool to the deactivated pool in response to its use at the merchant 140.

However, simply deactivating the single-use token may not be enough to address the additional processing needs that can arise after the payment is made n. For example, an auditor may need to verify the transaction. As another example, the cardholder may desire to return items purchased or submit a chargeback to the merchant 140. Since the mapping between the single-use token and the account number has been deactivated, the tokenization service 130 needs another way to verify the transaction.

To address this, the example embodiments maintain a mapping between the single-use token and a data element of the payment account number. For example, the tokenization service 130 may store a PAR value mapped to an identifier of the corresponding single-use token. Here, the PAR value is also mapped to the payment account number during the tokenization process by the tokenization service 130 and is assigned to the account number as part of the EMV framework. For example, the mapping may be stored in a mapping database 132 which maintains a mapping of token identifiers (of single-use tokens) to a respective payment account number. Thus, the example embodiments leverage data elements such as a PAR value which is already present with the single-use token to maintain an indirect mapping between the single-use token and its corresponding payment account number, via the PAR value, even after the mapping between the single-use token and the payment account number is deactivated.

When a user submits a refund based on the payment account number, the tokenization service 130 may identify the PAR value associated with the payment account number since that mapping is maintained by the tokenization service 130, and then use the PAR value to identify the single-use token based on the PAR value to token identifier mapping that is created in the process 101 of FIG. 1B, and stored in the mapping database 132. Here, the mapping may be used to verify that the payment account number is mapped to the deactivated single-use token used as the form of payment. Accordingly, even though the single-use token has been deactivated and is no longer an available token, the token can still be used for verification purposes based on the PAR value that is mapped to an identifier of the single-use token via the tokenization service 130.

Figure 1C:
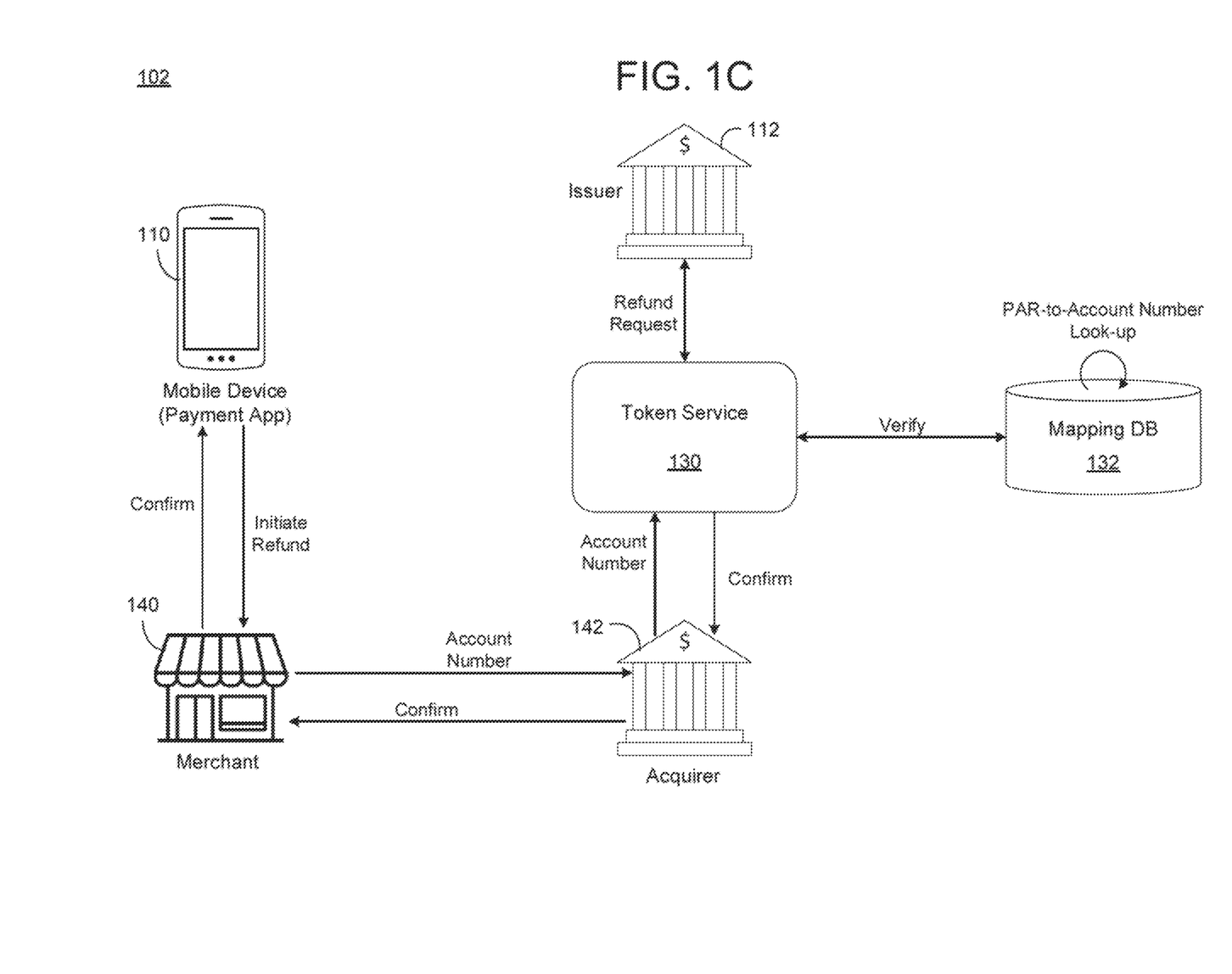
FIG. 1C is a diagram illustrating a process of performing a subsequent event on the deactivated token based on an element of the account number that is mapped to the deactivated token in accordance with an example embodiment.

FIG. 1C illustrates a process 102 of performing a subsequent transactional event on the deactivated token based on an element of the account number that is mapped to the deactivated token in accordance with an example embodiment. As an example, the subsequent transactional event may be a refund. But it should also be appreciated that other transactions may occur such as the auditing of a transaction history associated with the payment account, returning a purchase amount in response to a chargeback, loyalty point accrual, rewards points accrual, promotional offers, or the like.

Referring to FIG. 1C, the user initiates a refund with the merchant 140 via the payment application on the mobile device 110. Here, the user may submit the request via the payment application running on the mobile device 110. The request may include the payment account number (i.e., PAN) that is read from the credit card/payment card by the user or the payment application and submitted to the merchant 140. Here, the payment account number may correspond to the payment account number in FIGS. 1A and 1B that is tokenized and replaced with the single-use token. The merchant 140 may submit the refund request to the tokenization service 130 including the payment account number.

In response, the tokenization service 130 may perform a reverse-mapping to map the payment account number back to the single-use token to verify that the payment account number corresponds to the single-use token via the PAR value. In particular, the tokenization service 130 may map the payment account number to its corresponding PAR value created during the tokenization process and maintained by the tokenization service 130 in the mapping database 132. Next, the tokenization service may map the recovered PAR value to the single-use token identifier stored in the mapping database 132. The tokenization service 130 can then determine whether the transaction details of the transaction to be refunded include the single-use token as the payment token. If so, the tokenization service 130 confirms that the payment account number corresponds to the single-use token and authorizes validates the refund which may be authorized by the issuer 112. The authorization may be forwarded to the acquirer 142 and then to the merchant 140 which is also informed of the refund.

Figure 2:
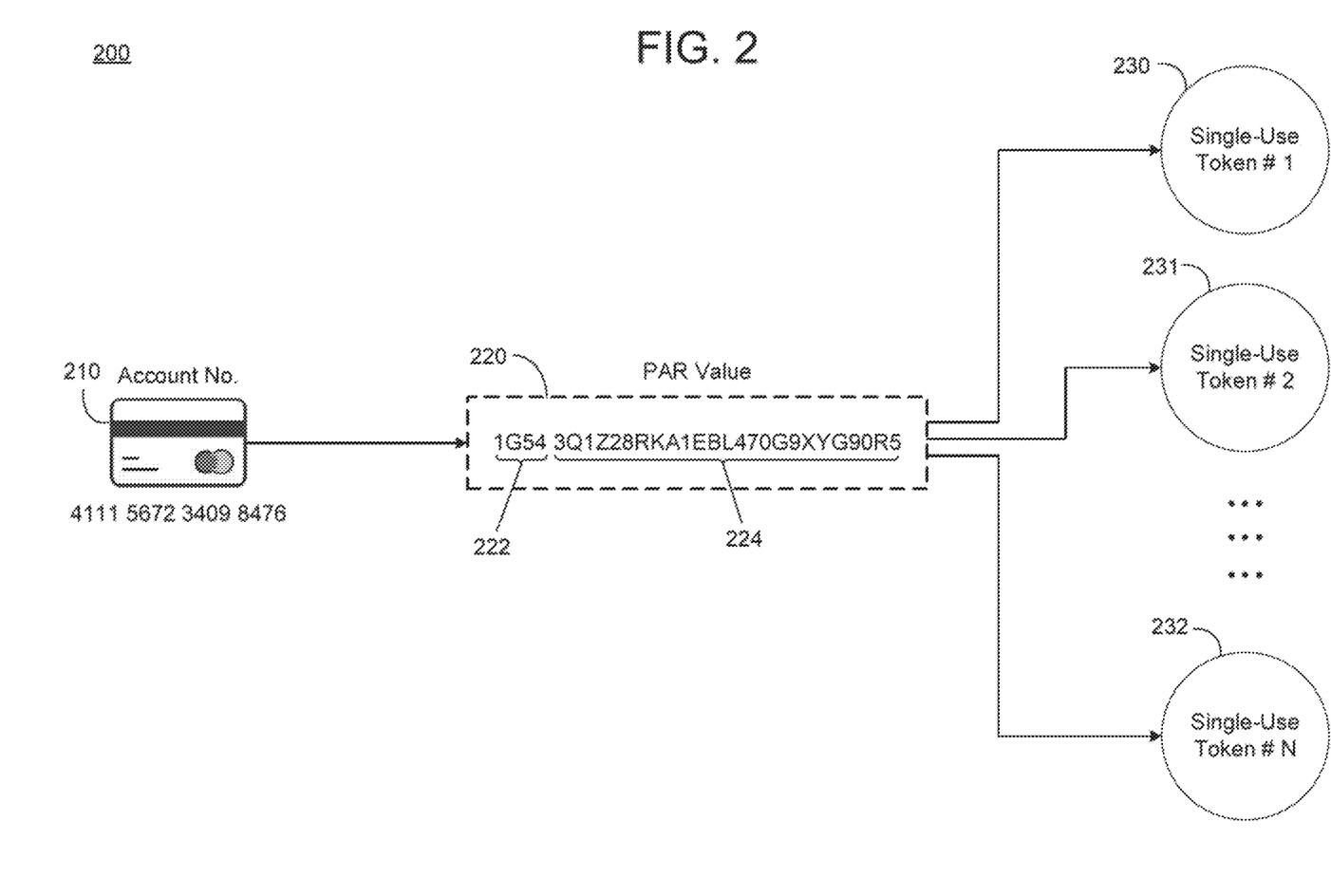
FIG. 2 is a diagram illustrating a mapping between an account number and multiple single-use tokens via a payment account reference (PAR) value in accordance with an example embodiment.

FIG. 2 illustrates a mapping 200 between a payment account number 210 and payment-enabled tokens 230, 231, and 232 via a payment account reference (PAR) value 220 in accordance with an example embodiment. Here, the mapping 200 may be maintained by the tokenization service 130 shown in FIGS. 1A-1C. Referring to FIG. 2, the PAR value 220 includes a twenty-nine character identifier that includes a first subset 222 (e.g., four characters) which are used to identify a BIN controller of the payment account number, and a second subset 224 (e.g., the remaining twenty-five characters) which are uniquely assigned to the payment account number 210 by the tokenization service. According to various embodiments, the mapping 200 includes a one-to-one mapping of the payment account number 210 to PAR value 220. However, the mapping 200 also includes a one-to-N mapping of PAR value 220 to payment-enabled tokens 230, 231, and 232 which may be single-use tokens. That is, the PAR value 220 may simultaneously be mapped to multiple single-use tokens while only being mapped to the payment account number 210.

Payment tokenization replaces the payment account number 210 with a payment token (e.g., payment-enabled tokens 230, 231, and 232 over time). As a result, the payment account number 210 may not be available as part of the payment transaction data. In addition, there can be multiple payment tokens associated with the payment account number 210 as noted in FIG. 2. The absence of the payment account number 210 may affect nonpayment use cases that rely on the payment account number 210 such as auditing and refunds. Without the payment account number 210 in the transaction, the PAR value 220 provides the ability to identify and link the payment-enabled tokens 230, 231, and 232, that map to the payment account number 210 (without having knowledge of the PAN).

A PAR value is a data element that is uniquely linked to a PAN (e.g., the payment account number 210 in FIG. 2); depending on how the issuer has set up their environment, a payment account may have multiple PANs, and therefore, each unique PAN will have its own PAR. An example use case is when the PAR value is generated, linked to a PAN, and then associated with all corresponding payment tokens when the PAN is tokenized. Other use cases are possible. It is important to consider how PAR is implemented with payment accounts that have a primary account owner and authorized users that are all issued cards. If the additional cards have the same PAN, they will have the same PAR; if the additional cards have different PANs, they will each have a unique PAR.

The PAR value allows for transaction activity to be linked across the PAN and related payment tokens. Using the PAR value to link related transactions provides various benefits. For example, the PAR value enables the payment network community to execute nonpayment functions in a manner that's consistent. The PAR value also reduces the risks associated with PAN storage. One of the primary long-term benefits of the PAR value include facilitating the payment industry's goal to limit PAN storage within the payment ecosystem. In general, any application or service that seeks to identify payment activity across payment transactions linked to an account will benefit from using the PAR value.

The PAR value, which is a nonfinancial attribute or non-payment enabled attribute, enables the payment network community to link transaction activity across related payment transactions without using the PAN. Removing PAN references from systems has the benefit of reduced risk for merchants, and potentially reduced PCI DSS requirements when PAN references are completely removed. Further, the PAR value cannot be reverse-engineered to get the PAN or payment token, nor can it be used to initiate a payment transaction. These factors make the PAR value fit for purpose from a risk perspective when compared to use of PAN as an identifier.

As payment ecosystems continue to leverage payment tokenization, the PAR value will be the primary mechanism to achieve a consolidated view of transactions associated with a PAN. Systems that are responsible for monitoring limits and thresholds, such as those needed to meet regulatory and anti-money laundering requirements, benefit from the visibility enabled by using the PAR value. Additional data analytics can be run on transaction data which now includes the PAR value field. As an example, when the PAR value is used, risk/fraud management systems may have visibility into transaction activity across related payment token-based and PAN-based transaction activity. This has the potential benefit of increasing the effectiveness of such risk/fraud systems in identifying fraud, thereby reducing fraud losses.

Furthermore, according to various embodiments, the PAR value can persist through PAN life cycle changes (e.g., when a payment card is re-issued, the PAN is changed, new single-use tokens are issued, etc.) If systems previously relied on the PAN as an identifier, those references would need to be updated. The PAR provides better longevity as an identifier that can be used in other relying systems.

The PAR value may be provided or used in various ways. For example, the PAR value may be used as part of a payment transaction, by being populated as part of the authorization response, by being passed from a payment device (e.g., card, mobile phone) to a payment terminal, if the payment device has been provisioned with the payment token and the PAR and if the terminal supports PAR data, and the like. The PAR value may also be used to implement a PAR inquiry service where queries can be received with PAR value identifiers, and such queries can be processed to identify all relevant transactions with such a PAR Value identifier, etc., from a transaction history such as a bank account statement, etc.

EMVCo has published a set of guidelines for using the PAR value that describe how it should fit into the overall payment processing environment. In addition, EMVCo has specified that the PAR cannot be used as a consumer identifier, nor used to identify PAN attributes or route transactions. However, each BIN controller is responsible for mandating specific PAR use and working with appropriate entities to incorporate the PAR value into the message specifications. Acquirers and payment processors may also implement the changes defined by the BIN controller to be able to make the PAR value available to merchants.

Figure 3A:
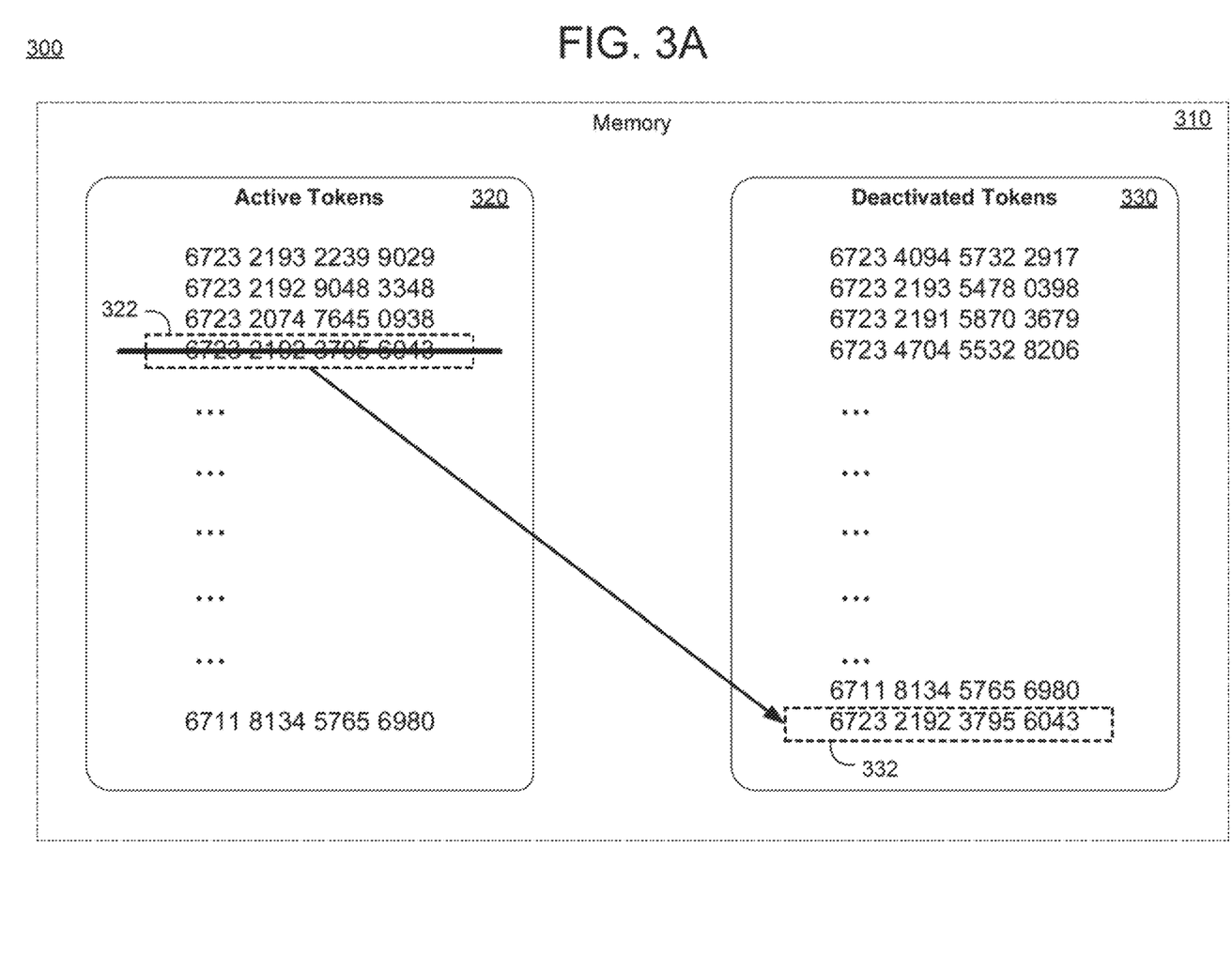
FIGS. 3A and 3B are diagrams illustrating processes of deactivating a token in accordance with example embodiments.

FIG. 3A illustrates a process 300 of deactivating a token in accordance with an example embodiment. For example, the token may be a single-use token or a multi-use token. However, for convenience, the examples herein are directed to single-use tokens. Referring to FIG. 3A, a tokenization service may maintain token pools 320 and 330 in a memory 310 of the server or other device where the tokenization service is hosted. In this example, the token pool 320 corresponds to tokens that are currently active and in use (i.e., they've been assigned to payment applications). Meanwhile, the token pool 330 corresponds to tokens that have been and are currently disabled by the tokenization service. The deactivation process may be temporary allowing the tokenization service to return the token identifier back to a pool of unused and active tokens (not shown).

In particular, in FIG. 3A, the tokenization service detects a payment from a single-use token having a token identifier 322 that is currently located in the token pool 320 dedicated to active and in use tokens. The tokenization service may be programmed or otherwise configured with computer instructions that enable the tokenization service to create the token pools 320 and 330 and also to move token identifiers between the token pools 320 and 330. In this case, the tokenization service may remove the token identifier 322 from the token pool 320 dedicated to active tokens and store a new token identifier 332 (which corresponds to the same token as token identifier 322) in the token pool 330 corresponding to deactivated tokens.

Figure 3B:
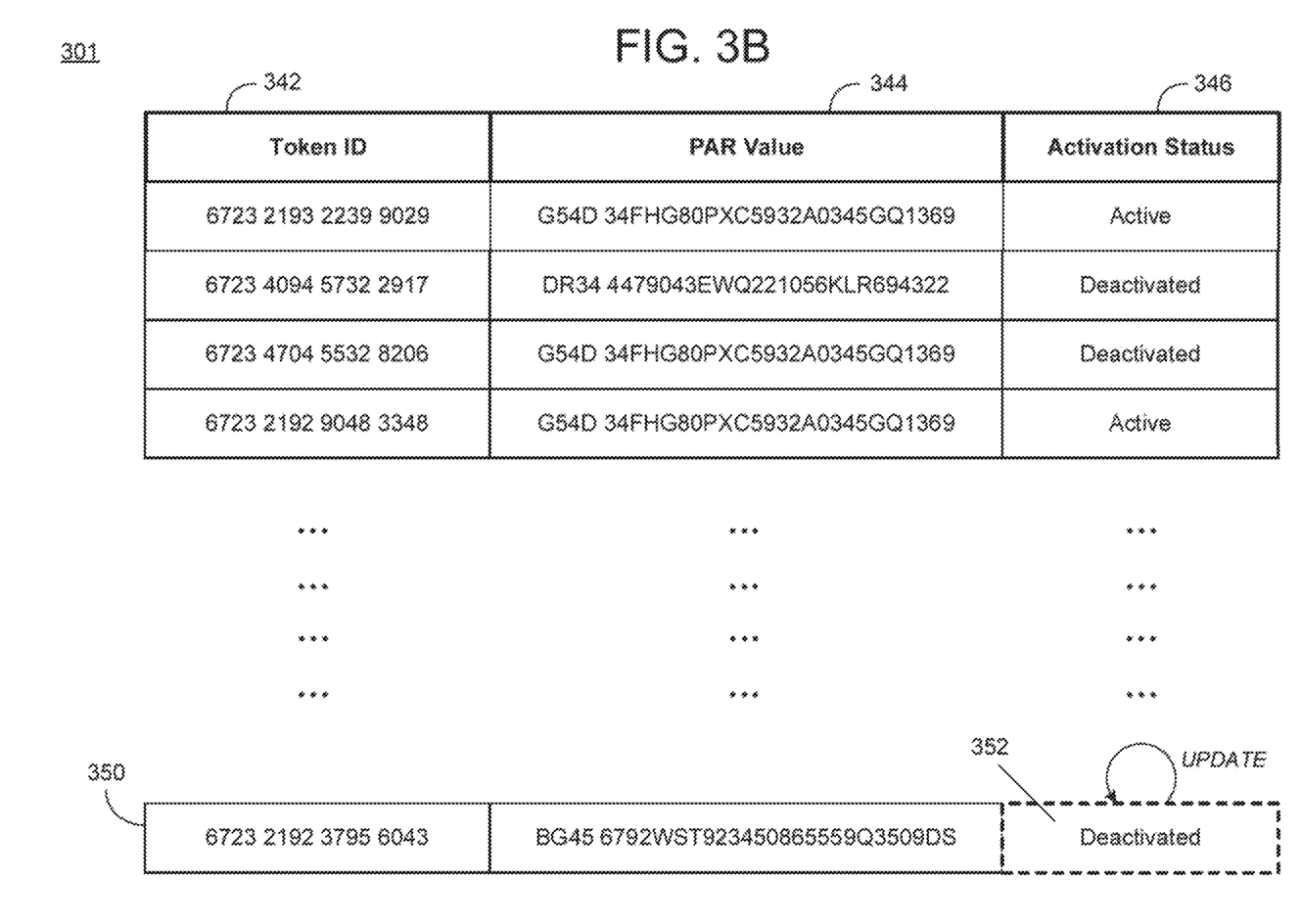

FIG. 3B illustrates a process 301 of deactivating a token in accordance with another example embodiment. Referring to FIG. 3B, the tokenization service may manage a table, spreadsheet, document, or the like, which includes lists of tokens. Here, the table includes a column 342 for the Token ID of the single-use token, a column 344 for the PAR value of the corresponding payment account number mapped to the single-use token, and a column 346 for the activation status of the token. Here, the tokenization service identifies that a single use token corresponding to entry 350 of the table has been used during a payment transaction. In response, the tokenization service may identify the entry 350 in the table and change/modify a value 352 of the activation status of the token to deactivated (from active). Although not shown in FIG. 3B, the reverse process may also be performed. That is, when a single-use token is returned from deactivated to active status, the tokenization service may change/modify the value 352 back to active status.

Figure 4:
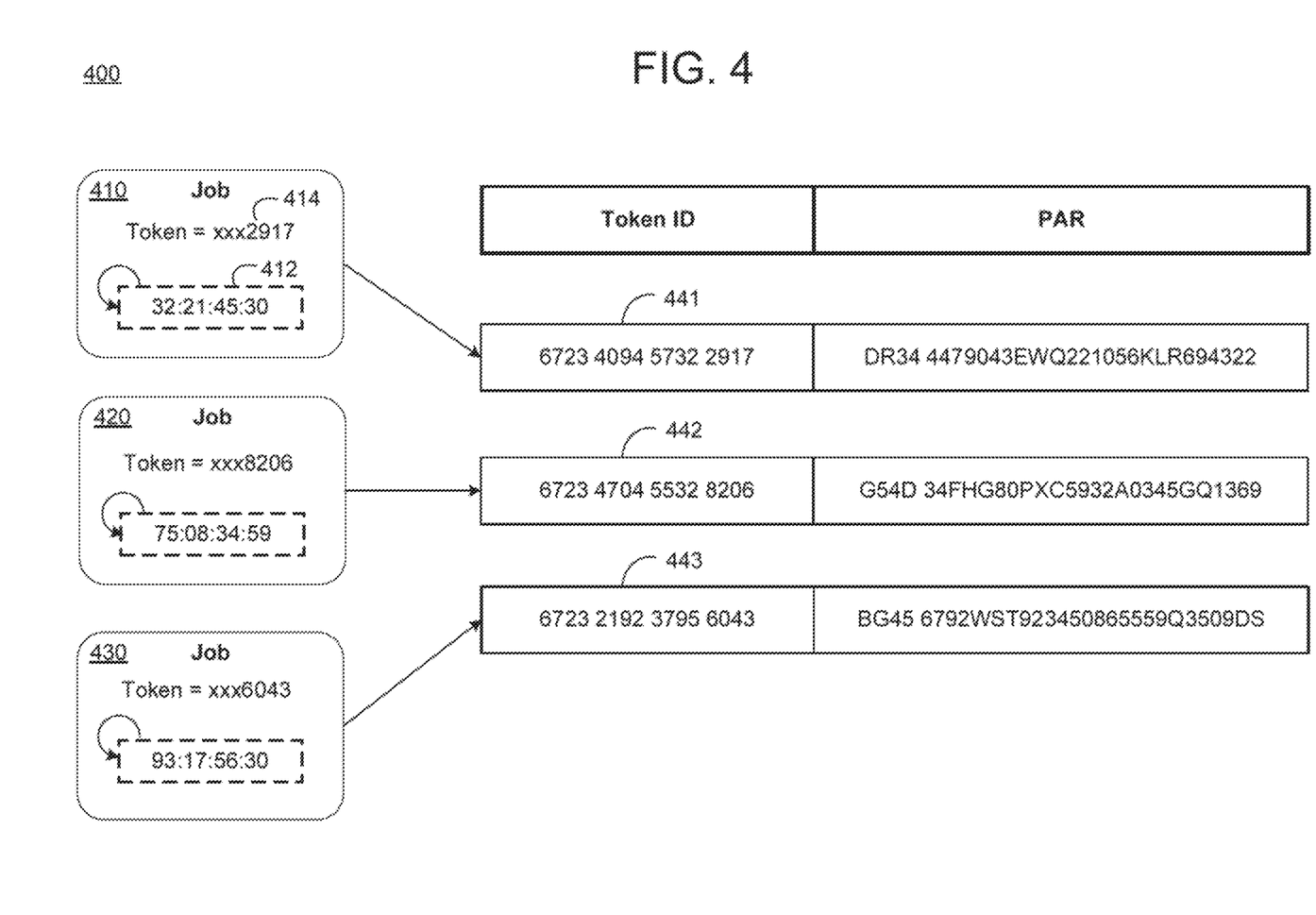
FIG. 4 is a diagram illustrating a process of managing activation statuses of multiple tokens in accordance with an example embodiment.

FIG. 4 illustrates a process 400 of managing activation statuses of multiple tokens in accordance with an example embodiment. Referring to FIG. 4, the tokenization service may launch a time-to-live job with a timing function to monitor a deactivation period of a token identifier. In this example, time-to-live jobs 410, 420, and 430, have been started to countdown the deactivation periods of token identifiers 441, 442, and 443, respectively. As an example, the time-to-live jobs 410, 420, and 430 may be cron jobs or other utilities that are executed for a particular purpose, which in this case is to perform the countdown of the deactivation period. Each of the time-to-live jobs may be embedded with an identifier 414 of a corresponding token, and a timer 412. Because the tokens will be deactivated at different times, each token may have its own time-to-live job. As another example, multiple tokens may be monitored by the same time-to-live job. For example, all tokens used on the same day and therefore deactivated on the same day may be added to the same time-to-live job, etc. Here, the time-to-live job may be based on days (e.g., 120 days, etc.)

Figure 5:
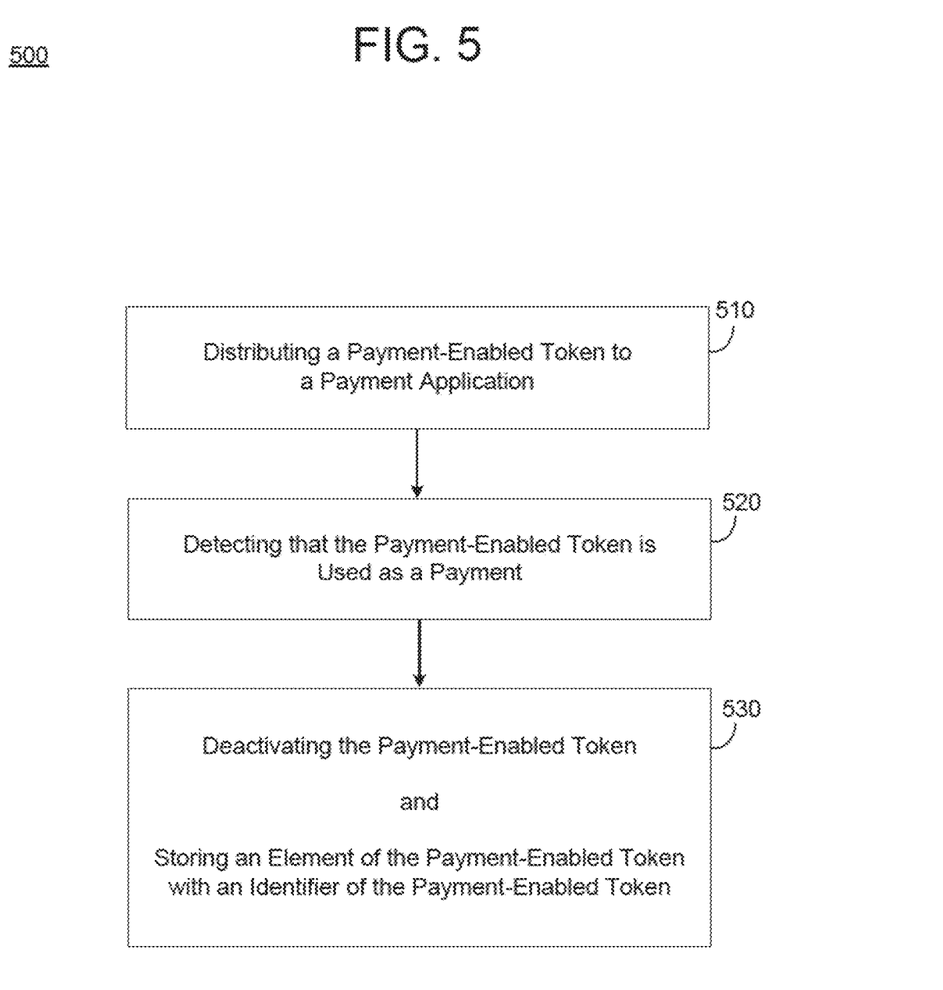
FIG. 5 is a diagram illustrating a method of deactivating a single-use token in accordance with an example embodiment.

FIG. 5 illustrates a method 500 of deactivating a single-use token in accordance with an example embodiment. For example, a processing unit (e.g., one or more processors, processing cores, processor threads, etc.) of computing device (e.g., cloud platform, database, server, personal computer, etc.) may execute software program code to cause the computing device to perform the method 500. For example, the method 500 and all other methods and processes herein may be embodied in computer-executable program code that may be read from one or more non-transitory computer-readable media, such as a flash drive, a CD-ROM, a DVD-ROM, an external disk, a magnetic tape, or the like, and then stored in a compressed, uncompiled and/or encrypted format. In some embodiments, hard-wired circuitry may be used instead of, or in combination with program code to implement the methods and processes. Embodiments are not limited to any specific combination of hardware and software. As an example, the method 500 may be performed by a single device such as a web server, or a combination of multiple devices.

Referring to FIG. 5, in 510, the method may include distributing, via a server, a payment-enabled token to a payment application on a computing device, the payment-enabled token being mapped to a payment account of the payment application via a tokenization service. For example, the token may be distributed in response to a request from the payment application and may be "tokenized" onto a secure element of the computer device. In 520, the method may include detecting use of the payment-enabled token as a payment via the payment application. For example, the payment-enabled token may be used during a payment authorization request from the payment application to a merchant terminal. In response to the detecting, in 530, the method may include deactivating the payment-enabled token at the server and storing an additional data element of the payment-enabled token mapped to an identifier of the payment-enabled token in a data structure of the server.

In some embodiments, the storing may include storing a payment account reference (PAR) value of the single-use token with the identifier of the single-use token in one or more of a table, a document, and a file. Here, the PAR value may include a twenty-nine character alphanumeric data element including four characters dedicated to a bin controller. In some embodiments, the deactivating may include pulling the single-use token out of a pool of available single-use tokens in the data structure and storing the single-use token in a temporary pool of deactivated single-use tokens in the data structure. In some embodiments, the method may further include returning the single-use token to the pool of available single-use tokens in the data structure after expiration of a predetermined amount of time.

In some embodiments, the deactivating may include attaching a deactivation flag to the single-use token in the data structure which distinguishes the single-use token from other single-use tokens that are not deactivated by the server. In some embodiments, the method may further include generating and executing a time-to-live job which monitors a timer and marks the single-use token as available again after expiration of a predetermined amount of time of the timer. In some embodiments, the method may further include receiving a refund request for the payment made via the single-use token, and in response, identifying the payment account based on the PAR stored with the identifier of the single-use token in the data structure, and processing the refund based on the identification of the payment account.

Figure 6:
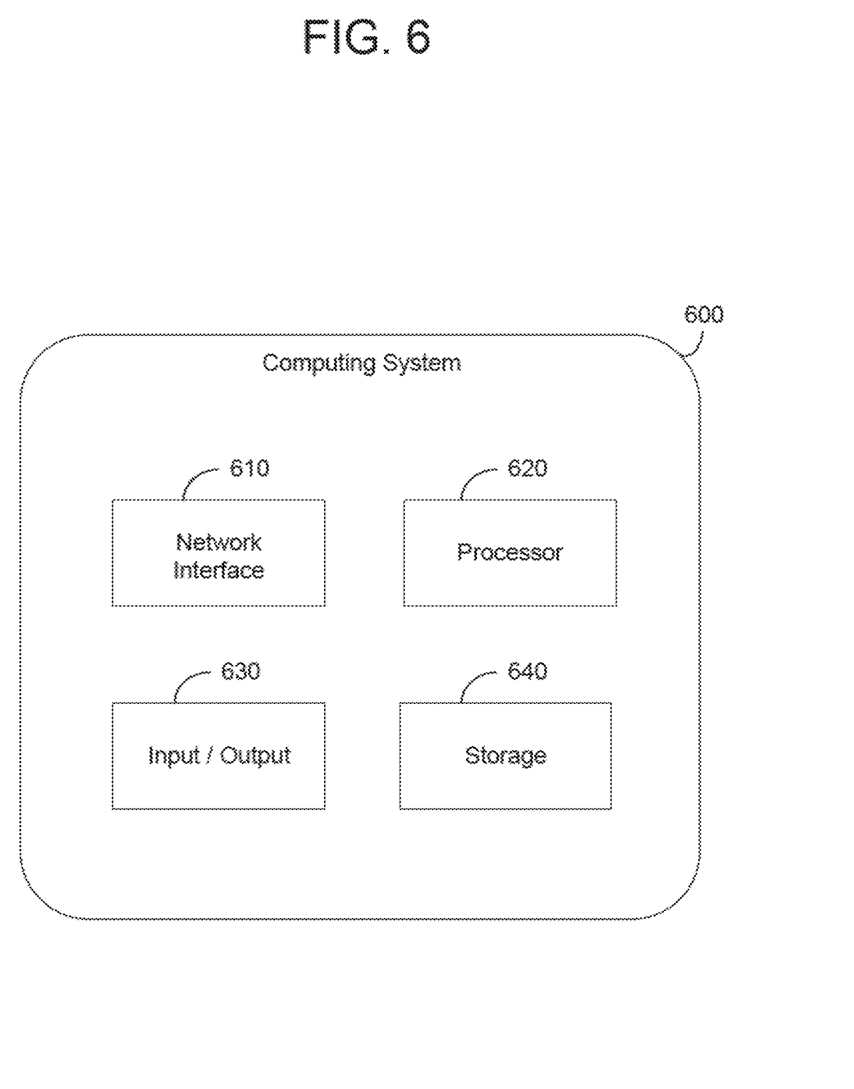
FIG. 6 is a diagram illustrating a computing system for use in the examples herein in accordance with an example embodiment.

FIG. 6 illustrates a computing system 600 that may be used in any of the methods and processes described herein, in accordance with an example embodiment. For example, the computing system 600 may be a mobile device, a server, a cloud platform, a payment network system, a merchant computer, or the like. In some embodiments, the computing system 600 may be distributed across multiple computing devices. Referring to FIG. 6, the computing system 600 includes a network interface 610, a processor 620, an input/output 630, and a storage device 640 such as an in-memory storage, and the like. Although not shown in FIG. 6, the computing system 600 may also include or be electronically connected to other components such as a display, an input unit(s), a receiver, a transmitter, a persistent disk, and the like. The processor 620 may control or replace the other components of the computing system 600.

The network interface 610 may transmit and receive data over a network such as the Internet, a private network, a public network, a payment network, an enterprise network, and the like. The network interface 610 may include a wireless interface, a wired interface, or a combination thereof. The processor 620 may include one or more processing devices each including one or more processing cores. In some examples, the processor 620 is a multicore processor or a plurality of multicore processors. Also, the processor 620 may be fixed or it may be reconfigurable. The input/output 630 may include an interface, a port, a cable, a bus, a board, a wire, and the like, for inputting and outputting data to and from the computing system 600. For example, data may be output to an embedded display of the computing system 600, an externally connected display, a display connected to the cloud, another device, and the like. The network interface 610, the input/output 630, the storage device 640, or a combination thereof, may interact with applications executing on other devices.

The storage device 640 is not limited to a particular storage device and may include any known memory device such as RAM, ROM, hard disk, and the like, and may or may not be included within a database system, a cloud environment, a web server, or the like. The storage device 640 may store software modules or other instructions which can be executed by the processor 620 to perform the methods described herein.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
a storage device; and
a processor configured to
distribute a payment-enabled token to a hardware element on a user device which includes a payment application installed therein, and store a mapping of the payment-enabled token to a payment account number (PAN) held in the payment application via the storage device, detect an initial use of the payment-enabled token as a form of payment within a payment transaction by the payment application via a submission of the payment-enabled token to an electronic payment network coupled to the tokenization service, in response to detection of the initial use of the payment-enabled token, deactivate the payment-enabled token via the tokenization service, and change the mapping in the storage device to indicate that the payment-enabled token is no longer mapped to the PAN, wherein the changing comprises changing the mapping in the storage device to map a payment account reference (PAR) value of the payment-enabled token which links back to the PAN to an identifier of the payment-enabled token within one or more of a table, a document, and a file in the storage device, receive a request to access the payment transaction made with the deactivated payment-enabled token, wherein the request comprises an identifier of the payment-enabled token, and map the identifier of the payment-enabled token to the PAN based on the changed mapping in the storage device, and accessing content from the payment transaction based on the PAN.

2. The computing system of claim 1, wherein the PAR value comprises a twenty-nine character alphanumeric data element including four characters dedicated to a bin controller.

3. The computing system of claim 1, wherein the processor is configured to pull the payment-enabled token out of a pool of available single-use tokens stored in the storage device and store the payment-enabled token in a temporary pool of deactivated single-use tokens stored in the storage device.

4. The computing system of claim 3, wherein the processor is further configured to return the payment-enabled token to the pool of available single-use tokens in the storage device after expiration of a predetermined amount of time.

5. The computing system of claim 1, wherein the processor is configured to attach a deactivation flag to the payment-enabled token in the storage device which distinguishes the payment-enabled token from other single-use tokens that are not deactivated within the storage device.

6. The computing system of claim 1, wherein the processor is further configured to generate and execute a time-to-live job which comprises a pointer to the payment-enabled token stored in the storage device, detect expiration of a predefined period of time based on the execution of the time-to-live job, and in response to the detection, return the payment-enabled token to a pool of available payment-enabled tokens.

7. The computing system of claim 1, wherein the processor is further configured to receive a refund request for the payment transaction made via the payment-enabled token, and in response, verify the payment-enabled token corresponds to the PAN based on the changed mapping of the payment-enabled token in the storage device.

8. A method comprising:

distributing a payment-enabled token to a hardware element on a user device which includes a payment application installed therein, and store a mapping of the payment-enabled token being to a payment account number (PAN) held in the payment application via the storage device;

detecting an initial use of the payment-enabled token as a form of payment by the payment application via a submission of the payment-enabled token to an electronic payment network coupled to the tokenization service;

in response to the detecting the initial use of the payment-enabled token, deactivating the payment-enabled token via the tokenization service, and changing the mapping in the storage device to indicate that the payment-enabled token is no longer mapped to the payment account, wherein the changing comprises changing the mapping in the storage device to map a payment account reference (PAR) value of the payment-enabled token which links back to the PAN to an identifier of the payment-enabled token within one or more of a table, a document, and a file in the storage device;

receiving a request to access the payment transaction made with the deactivated payment-enabled token, wherein the request comprises an identifier of the payment-enabled token; and mapping the identifier of the payment-enabled token to the PAN based on the changed mapping in the storage device, and accessing content from the payment transaction based on the PAN.

9. The method of claim 8, wherein the PAR value comprises a twenty-nine character alphanumeric data element including four characters dedicated to a bin controller.

10. The method of claim 8, wherein the deactivating comprises pulling the payment-enabled token out of a pool of available single-use tokens stored in the storage device and storing the payment-enabled token in a temporary pool of deactivated single-use tokens stored in the storage device.

11. The method of claim 10, wherein the method further comprises returning the payment-enabled token to the pool of available single-use tokens in the storage device after expiration of a predetermined amount of time.

12. The method of claim 8, wherein the deactivating comprises attaching a deactivation flag to the payment-enabled token in the storage device which distinguishes the payment-enabled token from other single-use tokens that are not deactivated within the storage device.

13. The method of claim 8, wherein the method further comprises generating and executing a time-to-live job which comprises a pointer to the payment-enabled token stored in the storage device, detecting expiration of a predefined period of time based on the execution of the time-to-live job, and in response to the detection, returning the payment-enabled token to a pool of available payment-enabled tokens.

14. The method of claim 8, wherein the method further comprises receiving a refund request for the payment transaction made via the payment-enabled token, and in response, verifying the payment-enabled token corresponds to the payment account based on the changed mapping of the payment-enabled token in the storage device.

15. A non-transitory computer-readable medium comprising instructions which when executed by a processor cause a computer to perform a method comprising:

distributing a payment-enabled token to a hardware element on a user device which includes a payment application installed therein, and storing a mapping of the payment-enabled token to a payment account held in the payment application via a storage device of a tokenization service;

detecting an initial use of the payment-enabled token as a form of payment by the payment application via a submission of the payment-enabled token by the payment application to an electronic payment network coupled to the tokenization service;

in response to the detecting of the initial use, deactivating the payment-enabled token via the tokenization service, and changing the mapping in the storage device to indicate that the payment-enabled token is no longer mapped to the payment account, wherein the changing comprises changing the mapping in the storage device to map a payment account reference (PAR) value of the payment-enabled token which links back to the PAN to an identifier of the payment-enabled token within one or more of a table, a document, and a file in the storage device;

receiving a request to access the payment transaction made with the deactivated payment-enabled token, wherein the request comprises an identifier of the payment-enabled token; and mapping the identifier of the payment-enabled token to the PAN based on the changed mapping in the storage device, and accessing content from the payment transaction based on the PAN.

16. The non-transitory computer-readable medium of claim 15, wherein the deactivating comprises pulling the payment-enabled token out of a pool of available single-use tokens in the storage device and storing the payment-enabled token in a temporary pool of deactivated single-use tokens in the storage device.

17. The non-transitory computer-readable medium of claim 15, wherein the deactivating comprises attaching a deactivation flag to the payment-enabled token in the storage device which distinguishes the payment-enabled token from other single-use tokens that are not deactivated by the tokenization service.

* * * * *